United States Patent [19]

Hennig et al.

[11] 4,447,929

[45] May 15, 1984

[54] SCRAPER DEVICE AND ASSEMBLY TOOL

[75] Inventors: Kurt Hennig, Munich; Manfred Klein, Ismaning; Matthias Nuspl, Munich, all of Fed. Rep. of Germany

[73] Assignee: Gebr. Henning GmbH, Ismaning, Fed. Rep. of Germany

[21] Appl. No.: 353,345

[22] Filed: Mar. 1, 1982

[30] Foreign Application Priority Data

Mar. 17, 1981 [DE] Fed. Rep. of Germany ... 8107714[U]
May 13, 1981 [DE] Fed. Rep. of Germany ... 8114012[U]

[51] Int. Cl.³ .............................................. F16C 29/08
[52] U.S. Cl. .................. 15/256.5; 15/236 R; 15/245
[58] Field of Search ............... 15/236 R, 256.5, 245, 15/121

[56] References Cited

U.S. PATENT DOCUMENTS 2,109,626 3/1938 Sowers ............................... 15/245 X
2,711,552 6/1955 Lengyel ............................ 15/245 X
2,814,062 11/1957 Greisen ................................ 15/245

FOREIGN PATENT DOCUMENTS 504083 4/1939 United Kingdom .................. 15/245

Primary Examiner—Chris K. Moore
Attorney, Agent, or Firm—Learman & McCulloch

[57] ABSTRACT

The invention concerns a scraper device, as well as a tool for assembling such scraper device. The scraper device includes a scraper element and a support element, the scraper element having a groove permitting elastic deformation to establish a form-locking connection between the scraper element and the support element. The tool has a groove sloping toward guide surfaces and enables pressing of the scraper element into the support element by means of an area of pressure that expands in width.

14 Claims, 7 Drawing Figures

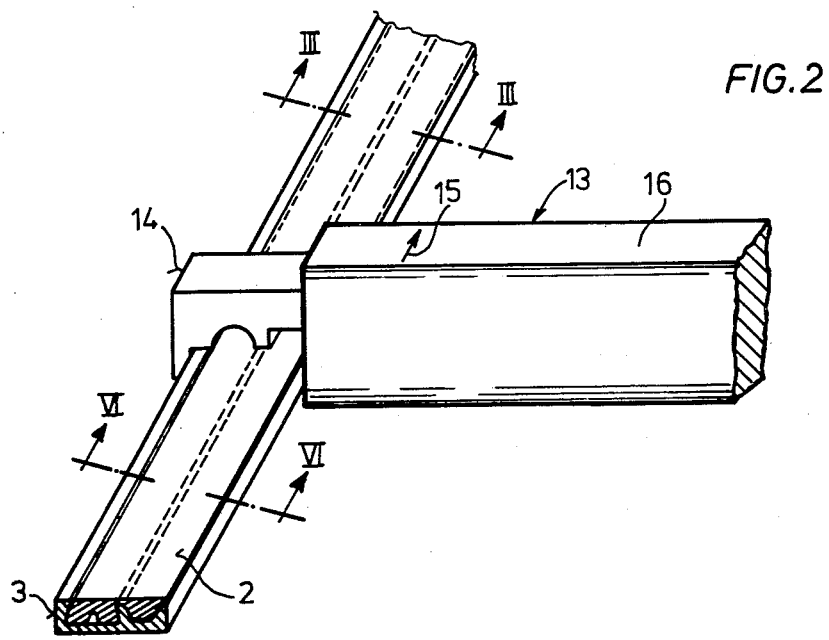
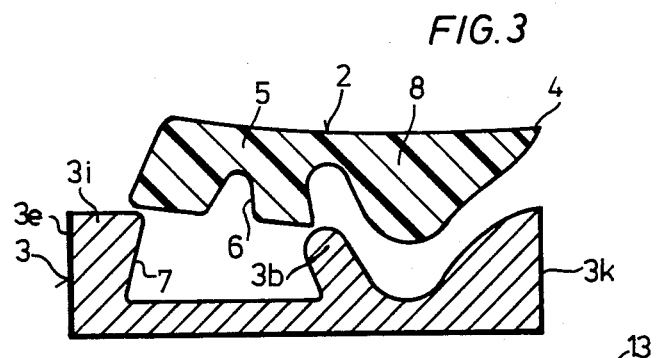
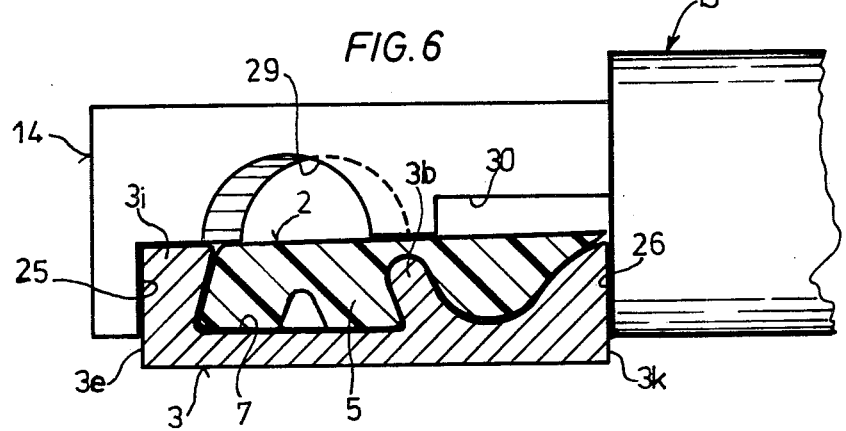

SCRAPER DEVICE AND ASSEMBLY TOOL

BACKGROUND OF THE INVENTION

The invention concerns a scraper device particularly intended for guideways of machine tools as well as for covering boxes of such guideways. The scraper comprises a scraper element formed from a material subject to elastic deformation and provided with a scraper lip and an anchoring extension, and a support element formed from a rigid material provided with a recess for anchoring such scraper element, whereby the scraper element and the support element are releasably connected by interlocking cascading projections.

Scraper devices of the type mentioned are familiar, for example, from DE-AS No. 24 01 674 and DE-GM No. 75 35 971. Whereas a plastic material of comparatively low elasticity is selected for the scraper element (which is sometimes unavoidable of achieving high abrasion resistance), frequently much effort is required to release or establish the formlocking connection between the scraper element and the support element (be means of interlocking projections). This difficulty exists in an especially pronounced fashion primarily when the interlocking projections of the scraper element and of the support element are of a comparatively large size to ensure a particularly reliable connection between the scraper element and the support element.

Mounting such scraper element in the support element is customarily effected with the aid of a screwdriver or a similar tool, by means of which the dovetailed cross-section of the scraper element is pressed into the complementally shaped groove of the support element while the scraper element undergoes elastic deformation until a form-locking connection is established between the scraper element and the support element. This mounting procedure is time consuming and cumbersome. Correspondingly wasteful is also a later exchange of such a scraper device.

Accordingly, a principal objective of the present invention is to avoid these disadvantages by constructing a scraper device in which it is possible to connect or release the form-locking connection between the scraper element and the support element in a very simple manner. An additional objective is to provide a tool such that assembly of the scraper element and the support element is particularly simple and involves little effort.

SUMMARY OF THE INVENTION

The scraper device has an anchoring extension in which is provided a groove, the position and dimension of such groove being such that a form-locking connection between the scraper element and the support element is readily established or released as a result of the elastic deformation of the anchoring extension when the groove is compressed.

The tool is provided with a recess open across one broad side and accepting the cross-section profile of the support element, such recess being defined at its two narrow sides by lateral guide surfaces serving to guide the tool endwise of the support element, the guide surfaces fitting against the two longitudinal edges of the support element, whereas that surface of the tool defined by the other broad side of the recess is provided with a top guide surface that will bear on the rear shoulder of the support element, an area of pressure that will bear on the scraper element in the area of the middle projection, and a groove located between the top guide surface and the area of pressure, such groove sloping toward the lateral guide surfaces so that the top guide surface tapers off in the direction of movement of the tool and the area of pressure expands in width.

The tool of the present invention is particularly suited for the assembly of the just-mentioned scraper device of the present invention. The tool can, however, also be used to advantage for scraper devices that do not have a groove in the anchoring extension of the scraper element, and for which thus the distortion of the anchoring extension necessary to establish the connection between the scraper element and the support element is achieved exclusively by elastic deformation.

DESCRIPTION OF THE DRAWINGS

FIG. 2 is a perspective drawing of the tool of the invention during assembly of the scraper device of FIG. 1;

FIG. 3 is a section taken on the line III—III of FIG. 2 to show the scraper element and the support element prior to assembly;

FIG. 6 is a section taken on line VI—VI of FIG. 2 to show the scraper element and support element in an assembled state.

DETAILED DESCRIPTION

Figure 1:
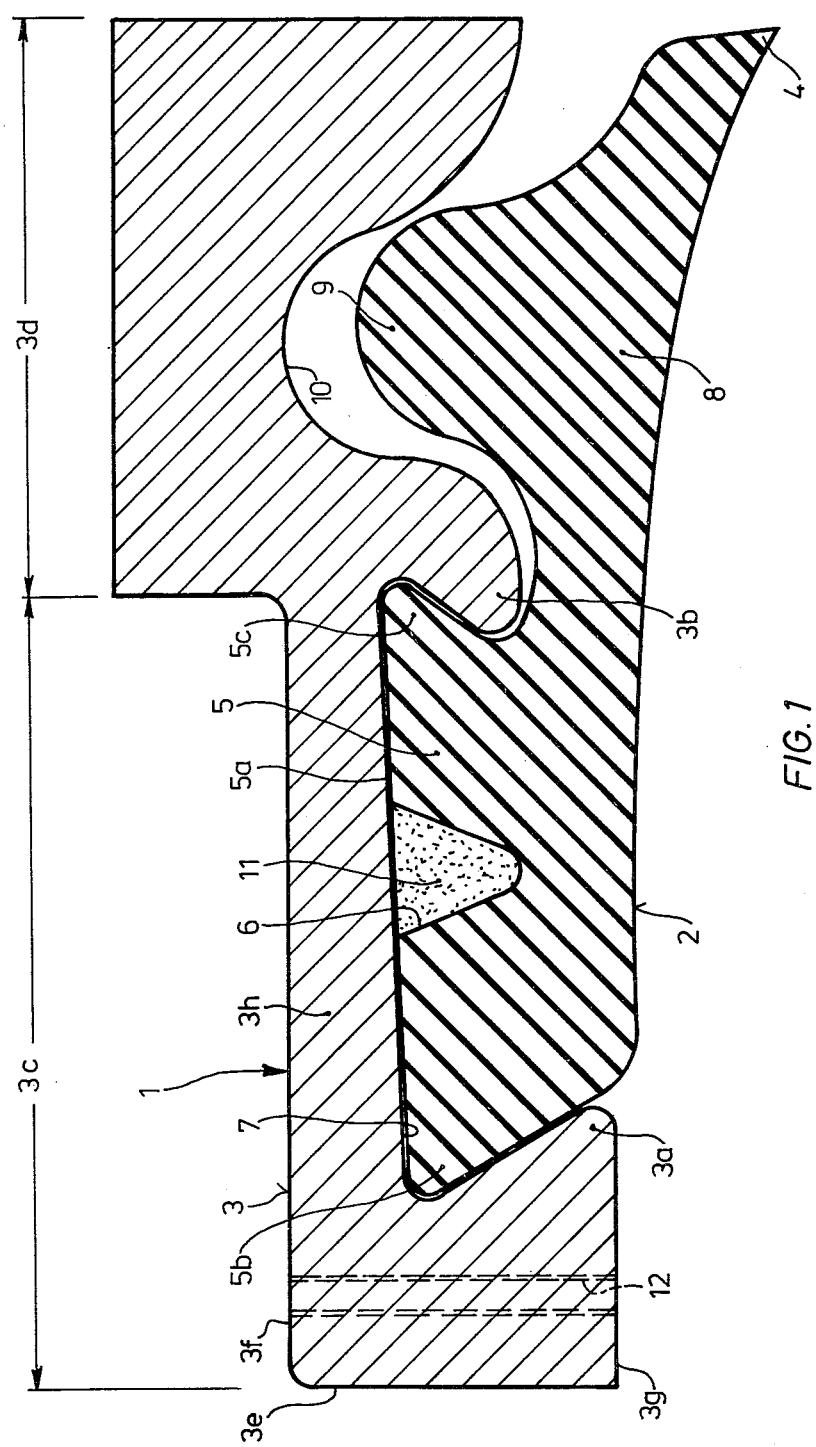
FIG. 1 is an enlarged cross-section of the scraper device of the present invention.
Figure 4:
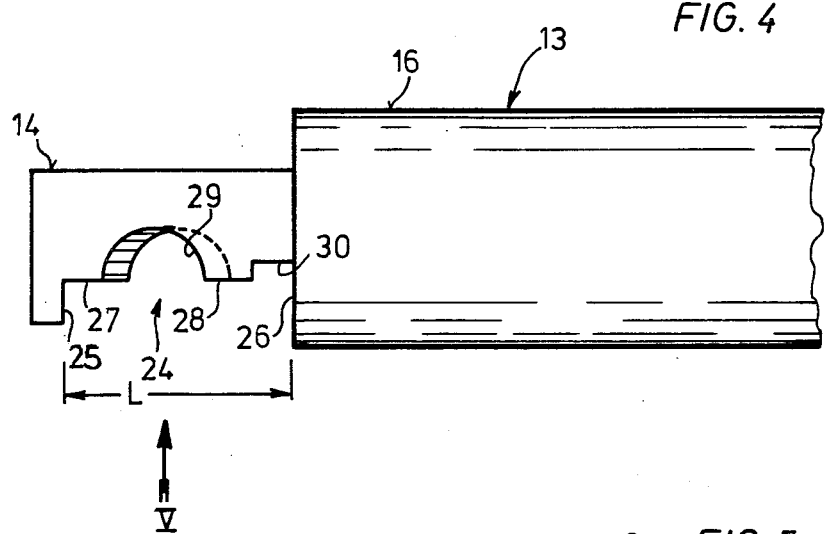
FIG. 4 is a side view of the tool of the invention.

The scraper device illustrated in FIG. 1 has an elongated shape of unchanging cross-section. It is particularly intended for guideways of machine tools or covering boxes (telescoping coverings) of such guideways.

The scraper device 1 consists of two main sections, namely a scraper element 2 of material subject to elastic deformation as well as a support element 3 of rigid material. The scraper element 2 has a scraper lip 4 as well as an anchoring extension 5 of preferably dovetailed cross-section. This anchoring extension 5 is provided on its side 5a (preferably at about its middle section) facing the support element 3, with a groove 6 of approximately wedge or V-shaped cross section which becomes broader or flares in the direction of the support element 3.

The support element 3 is provided with a recess 7 for anchoring the scraper element 2, in particular for accepting the anchoring extension 5. Recess 7 in the support element 3 is provided for that purpose also with a dovetailed cross-section whereby the dovetailed form of the anchoring extension and that of the recess 7 each fit into the other. Thereby they provide interlocking cascading projections 3a, 5b and 3b, 5c by means of which the scraper element 2 and the support element 3 are releasably interconnected. When viewed in longitudinal direction (at right angles to the drawing plane of FIG. 1), the scraper element 2 and the support element 3 each have the shape of an elongated profiled strip.

So that the scraper element 2 and the support element 3 can easily be assembled, and if necessary also be easily released again (perhaps to exchange the scraper element 2), the anchoring extension 5 is provided with the groove 6 mentioned. Its dimensions are such that the form-locking connection between the scraper element 2 and the support element 3 can be released by elastically distorting the anchoring extension 5 by compressing the groove 6.

The groove 6 in the anchoring extension 5 can remain open (not filled in). Nevertheless, depending upon the material selected for the scraper element 2, it may be advantageous to fill the groove 6 with a compressive porous or foam-like material 11. Compressibility of this material 11 should be distinctly greater than that of the scraper element 2. Suitably, this scraper element 2 consists of comparatively solid rubber, or of a similar plastic material having sufficiently elastic plasticity. Filling up the groove 6 with the material 11 permits increasing the resistance of the anchoring extension 5 as concerns compression such that a reliable snap-locking mechanism of both parts results upon inserting the scraper element 2 into the support element 3.

It is also possible to provide a simple and reliable interlocking or form-locking connection by inserting a locking rod (not shown) of approximate V-shaped cross-section into the open empty groove 6 of the anchoring extension 5 following fitting of the extension into the recess 7, thereby cancelling compressibility of the groove 6 and keeping the projections 5b, 5c of the anchoring extension 5 spread out.

The scraper element 2 is furthermore provided with a shoulder 8, its outer rim forming the scraper lip 4. The shoulder 8 is furthermore provided within the area between the scraper lip 4 and the anchoring extension 5, additionally with a reinforcing rib 9 facing the support element 3. In addition to a first transverse section 3c containing the recess 7, the support element 3 has a second transverse section 3d extending across the shoulder 8 of the scraper element 2. This second transverse section 3d is provided on its side facing the scraper element 2 with a recess 10 conforming to the profile of the reinforcing rib 9, said recess receiving the reinforcing rib 9 and at the same time overhanging the scraper lip 4. During operation (i.e., during elastic deformation of the scraper element 2), the second transverse section 3d of the support element 3 additionally supports the shoulder 8.

As long as the scraper device 1 is not mounted on a machine part or on the covering box of a guideway, the shoulder 8 of the scraper element 2 will protrude from the transverse section 3d of the support element 3 as a result of the inner pre-tension of the scraper element 2. Once the scraper element has been mounted on a machine part or on a covering box, the scraper element 2 with its scraper lip 4 may bear against the guideway or the next smaller covering box, whereby the shoulder 8 engages the recess 10 of the support element 3 and is braced by the transverse section 3d.

The scraper device 1 is attached to a machine part in suitable fashion, for example, by welding or screw fasteners. In the embodiment illustrated in FIG. 1, the support element 3 is provided with a borehole 12 in the transverse section 3c between the recess 7 and the longitudinal edge 3e, such borehole executed either as a simple bolt hole or as a taphole extending from the top side 3f to the bottom side 3g of the support element-transverse section 3c.

FIG. 1 shows that the thickness of the material comprising portion 3h of the transverse section 3c of the support element 3 tapers from the longitudinal edge 3e to the beginning of the transverse section 3d. This permits on the one hand keeping the support element 3 as rigid as possible by selecting a corresponding thickness of the material, while on the other hand it permits sufficiently extensive back tapering of the recess 7 primarily within the area of the projection 3b to ensure sufficient anchoring of the scraper element 2 in the support element 3.

The support element 3 is preferably manufactured of steel, thereby providing excellent protection for the scraper element 2. Depending upon the use intended, the support element 3 can also be manufactured of any other suitable metal, for example aluminum, or of a plastic of sufficient inherent stability.

FIGS. 2-6 illustrate the use of a tool 13 in inserting the scraper element 2 into the support element 3. The tool 13 is provided with a workpiece 14 attached to a handle element 16 by means of which the scraper element 2 is pressed into the support element 3 when the tool 13 is moved in the direction of the arrow 15.

FIG. 3 shows the scraper element 2 and the support element 3 prior to assembly, and FIG. 6 illustrates the condition after assembly (with the tool 13 still in place).

Figure 5:
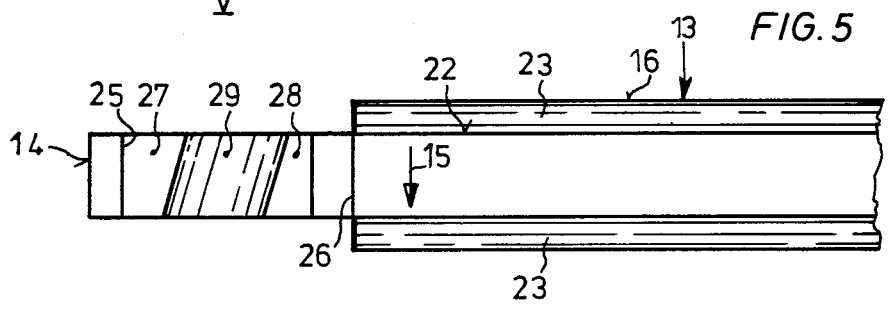
FIG. 5 is a view of the tool of FIG. 4 in the direction of the arrow V.

The tool 13 can be manufactured in a particularly simple version from a metal rod 22 of rectangular cross-section (see FIG. 5). The metal rod 22 thus extends across the entire length of the tool 13 so that it forms the workpiece 14 and the handle element 16. The handle element 16 is provided with gripping shells 23 on its opposite sides for ease of handling.

The workpiece 14 of the tool 13 illustrated in FIGS. 2-6 is provided with a recess 24 open toward one side. The recess has a length L (considered in axial direction of the metal rod 22) corresponding to the width of the support element 3 (see FIGS. 4 and 6), so that the recess 24 can accommodate the cross-section profile of the support element 3. The recess 24 is defined at its opposite ends by lateral guide surfaces 25, 26 serving to guide the tool 13 endwise of the support element 3, such guide surfaces fitting against the two longitudinal edges 3e and 3k of the support element 3 (see FIG. 6).

Adjacent one end of the means 24 is a top guide surface 27 that will bear on the shoulder 3i of the support element 3. Adjacent the opposite end of the recess is a pressure surface 28 that will bear on the scraper element 2 in the area of the middle projection 3b. Between the surfaces 27 and 28 is a groove 29. The groove 29 is not normal to the longitudinal axis of the rod 22, but instead is inclined toward the lateral guide surfaces 25, 26 such that the top guide surface 27 tapers in the direction of movement (arrow 15) of the tool 13, while the pressure surface 28 expands in width in the direction of such movement (see FIG. 5).

The inclined groove 29 is of uniform depth and can have a square, rectangular, oval or other cross-section. A cross-section of partly cylindrical form (as illustrated in the drawing) is preferred, however, because it is particularly easy to manufacture.

So that the force exerted by the pressure surface 28 on the scraper element 2 within the area of the middle projection 3b of the support element 3 can be fully effective, it is advantageous to provide an additional groove 30 in the workpiece 14 between the pressure surface 28 and its neighbouring lateral guide surface 26, such groove being rectilinear, and preferably rectangular, with respect to the direction of movement (arrow 15) of the tool 13.

To assemble the scraper element 2 and the support element 3, the scraper element 2 is initially placed loosely on top of the support element 3 so that the complementary grooves of the scraper element 2 and of the support element 3 are positioned opposite each other as is shown in FIG. 3. In order to press the scraper element 2 into the support element 3, the tool 13 is placed so that its recess 24 extends across the scraper element 2 and the support element 3. Thereby the lateral guide surfaces 25, 26 engage the support element 3 along the two longitudinal edges 3e, 3k. See FIG. 6. If downward force is now exerted on the scraper element 2 by means of the workpiece 14 of the tool 13, and the tool 13 is simultaneously moved in the direction of the arrow 15 (i.e., endwise of the support element 3), then the top guide surface 27 will bear on the shoulder 3i and the pressure surface 28 will bear on the scraper element 2 in the area of the middle projection 3b. The tapers of the surfaces 27, 28 enable the latter to exert a contracting force on the anchoring extension 5 of the scraper element 2 and the groove 6 provided in the scraper element 2 permits an elastic distortion of the scraper element to enable the extension to be pushed into the dovetailed recess 7 of the support 3. Accordingly, the scraper element 2 is fitted into and interlocked with the support element 3 as shown in FIG. 6. The tapering area of the guide surface 27 and the expanding area of pressure 28 ensure a smooth and gradual insertion of the scraper element 2 into the support element 3 as the tool 13 passes across the support.

Figure 7:
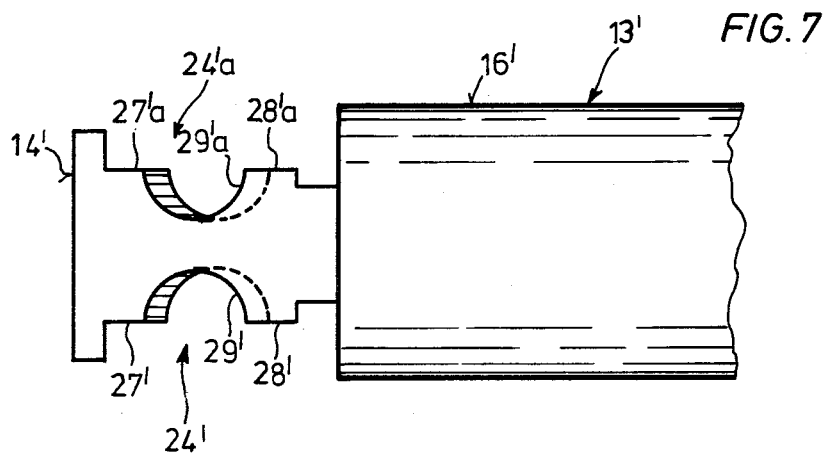
FIG. 7 is a side view of a second embodiment of the tool of the invention.

FIG. 7 illustrates a second embodiment of the tool according to the invention, its elements being provided with the same reference numerals as used in FIGS. 2-6, but with the addition of an apostrophe.

In contrast to the embodiment earlier described, the workpiece 14' has one recess each 24' on one side and a second recess 24'a, on the opposite side. The construction of these two recesses 24', 24'a corresponds to that of the recess 24 in the other embodiment, except that the top guide surfaces 27', 27'a, the pressure surfaces 28', 28'a, as well as the sloping grooves 29' 29'a, are in mirror-inverted relation to each other. This construction permits using the same tool (depending upon whether the recess 24' or 24'a is being used) to press the scraper element 2 into the support element 3 whether the direction of tool movement corresponds to that of the arrow 15 or is in the opposite direction. Thus, during the assembly it is possible first to use the recess 24' and movement of the tool 13' in the one direction to press the scraper element 2 into the support element 3, whereupon subsequently (after turning the tool around) and upon using the recess 24'a and guiding the tool in the opposite direction, it is possible to achieve a particularly reliable and firm seat of the scraper element already inserted into the support element 3, by pressing down once more while moving the tool back in the opposite direction.

As in the case of the embodiment of FIGS. 2-6, the respective top guide surfaces 27', 27'a of the tool of FIG. 7 also taper in the direction of movement of the tool 13' while the respective pressure surfaces 28', 28'a expand in width in the direction of movement of the tool.

What is claimed is:

1. In a machine tool scraper device of the kind adapted for use with guideways and the like and having an elastically deformable scraper element provided with a scraper lip and an anchoring extension, said device also including a support element formed of rigid material having a recess in which said scraper element is accommodated, the improvement wherein said anchoring extension has a groove therein enabling elastic deformation of said scraper element by compression of said groove to enable insertion of said scraper element into said recess of said support element, the elasticity of said scraper element enabling the latter to expand into a form locking fit in said recess, said scraper element having a reinforcing rib between said scraper lip and said anchoring extension.

2. The device according to claim 1 wherein said groove is substantially V-shaped in cross-section.

3. The device according to claim 1 wherein said groove contains material having a compressibility greater than that of the material from which said scraper element is formed.

4. The device according to claim 1 wherein said recess is dovetailed and said anchoring extension of said scraper element is correspondingly shaped in crosssection.

5. The device according to claim 1 wherein said support element has a second recess for the accommodation of said rib.

6. The device according to claim 1 wherein said support element and said scraper element have substantially complemental confronting surfaces.

7. The device according to claim 1 wherein said scraper element is formed of rubbery material and wherein said anchoring extension is prestressed in compression prior to being fitted into said recess and wherein said anchoring extension is maintained under compression in said groove.

8. The device according to claim 1 wherein said scraper element has an area of reduced cross-section between said lip and said groove.

9. A machine tool scraper device comprising an elastically deformable scraper body having at one end a scraper lip and at its opposite end an anchoring extension, and a rigid support element overlying said scraper body, said scraper body and said support element having confronting surfaces in engagement with one another over substantially the full length of said scraper body, said support element having in its confronting surface a recess in which said anchoring extension is accommodated, said recess and said anchoring extension being complementally contoured to interlock with one another and removably maintain said extension in said recess, said scraper lip being deflectable in a direction away from the confronting surface of said support element.

10. The device according to claim 9 wherein said anchoring extension of said scraper body has a groove therein for facilitating elastic deformation of said extension during the insertion and removal of said extension into and from said recess.

11. The device according to claim 10 wherein said groove is in that surface of said extension which confronts said support element.

12. The device according to claim 10 including a substance occupying said groove and having a compressibility greater than that of the material from which said scraper body is formed.

13. The device according to claim 9 wherein said scraper body has a reinforcing rib between said lip and said extension.

14. The device according to claim 13 wherein said support element has a groove in which said rib is accommodated.

* * * * *